(12) United States Patent
Dudar et al.

(10) Patent No.: US 9,415,680 B2
(45) Date of Patent: Aug. 16, 2016

(54) FUEL TANK DEPRESSURIZATION BEFORE REFUELING A PLUG-IN HYBRID VEHICLE

(71) Applicant: Ford Global Technologies, LLC, Dearborn, MI (US)

(72) Inventors: Aed M. Dudar, Canton, MI (US); Dennis Seung-Man Yang, Canton, MI (US); Mark Daniel Bunge, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 400 days.

(21) Appl. No.: 13/906,187

(22) Filed: May 30, 2013

(65) Prior Publication Data

US 2014/0352796 A1   Dec. 4, 2014

(51) Int. Cl.
*B60K 15/035* (2006.01)

(52) U.S. Cl.
CPC ..... *B60K 15/035* (2013.01); *B60K 2015/03514* (2013.01); *B60K 2015/03561* (2013.01); *B60Y 2200/92* (2013.01); *Y02T 90/14* (2013.01); *Y10S 903/904* (2013.01); *Y10T 137/0402* (2015.04)

(58) Field of Classification Search
CPC ............... B60K 15/035; B60K 2015/03514; B60K 2015/03561; Y10T 137/0402; B60Y 2200/92; Y10S 903/904
USPC ............... 123/518–520, 516, DIG. 2; 73/295, 73/204.11; 701/33.9, 34.4; 180/65.21–65.28; 903/902
See application file for complete search history.

(56) References Cited

U.S. PATENT DOCUMENTS

| | | | |
|---|---|---|---|
| 4,962,744 A | | 10/1990 | Uranishi et al. |
| 5,441,031 A | * | 8/1995 | Kiyomiya et al. ............ 123/518 |
| 5,687,697 A | * | 11/1997 | Ishikawa .......... B60K 15/03504 |
| | | | 123/520 |
| 6,964,193 B2 | | 11/2005 | Kobayashi et al. |
| 7,004,013 B2 | | 2/2006 | Kobayashi et al. |
| 7,233,845 B2 | | 6/2007 | Veinotte |
| 7,448,367 B1 | * | 11/2008 | Reddy et al. .................. 123/520 |
| 7,472,583 B2 | | 1/2009 | Kato et al. |
| 8,245,699 B2 | | 8/2012 | Peters et al. |
| 8,342,157 B2 | | 1/2013 | Der Manuelian et al. |
| 2002/0162457 A1 | * | 11/2002 | Hyodo ................. F02M 25/089 |
| | | | 96/109 |
| 2005/0044935 A1 | | 3/2005 | Barrera et al. |
| 2008/0041348 A1 | * | 2/2008 | Grant et al. .................... 123/519 |

(Continued)

FOREIGN PATENT DOCUMENTS

| | | |
|---|---|---|
| DE | 102011116320 A1 | 4/2012 |
| JP | H07317612 A | 12/1995 |

OTHER PUBLICATIONS

Jentz, Robert Roy et al., "Engine-Off Refueling Detection Method," U.S. Appl. No. 13/788,624, filed Mar. 7, 2013, 32 pages.

(Continued)

*Primary Examiner* — Hung Q Nguyen
*Assistant Examiner* — Brian P Monahon
(74) *Attorney, Agent, or Firm* — James Dottavio; Alleman Hall McCoy Russell & Tuttle LLP

(57) ABSTRACT

Methods and systems for controlling a locking mechanism on a fuel cap for refueling a vehicle are disclosed. In one example approach, a method comprises venting a fuel tank into a vapor absorbent canister in response to a request to refuel and unlocking the fuel cap in response to a predetermined temperature change in said canister.

10 Claims, 4 Drawing Sheets

(56) References Cited

U.S. PATENT DOCUMENTS

| | | | | |
|---|---|---|---|---|
| 2010/0126477 | A1* | 5/2010 | Reddy | 123/520 |
| 2010/0132676 | A1* | 6/2010 | Kitamura | F02D 41/0045 |
| | | | | 123/520 |
| 2010/0252006 | A1* | 10/2010 | Reddy | 123/519 |
| 2011/0203947 | A1* | 8/2011 | Ogawa | F02M 25/089 |
| | | | | 206/216 |
| 2011/0247595 | A1* | 10/2011 | Ogita | F02M 25/089 |
| | | | | 123/521 |
| 2011/0265768 | A1* | 11/2011 | Kerns et al. | 123/521 |
| 2012/0097269 | A1* | 4/2012 | Horiba et al. | 137/551 |
| 2012/0152210 | A1* | 6/2012 | Reddy | F02M 25/089 |
| | | | | 123/520 |
| 2012/0211087 | A1 | 8/2012 | Dudar et al. | |
| 2012/0215399 | A1 | 8/2012 | Jentz et al. | |
| 2013/0133629 | A1* | 5/2013 | Ogita | F02M 25/08 |
| | | | | 123/519 |

OTHER PUBLICATIONS

Yang, Dennis Seung-Man et al., "Refueling Detection for Diagnostic Monitor," U.S. Appl. No. 13/875,201, filed May 1, 2013, 31 pages.

Dudar, Aed M. et al., "Internal Orifice Characterization in Leak Check Module," U.S. Appl. No. 13/891,054, filed May 9, 2013, 37 pages.

Lindlbauer, Michael Paul et al., "Fuel Tank Isolation Valve Control" U.S. Appl. No. 13/948,668, filed Jul. 23, 2013, 30 pages.

Anonymous, "Method of Controlling Canister Temperature Using Piezo-Electric Material to Improve Emissions in HEV," IPCOM No. 000234770, Published Feb. 3, 2014, 2 pages.

Anonymous, "Electric Grid Utilization for Controlling Canister Temperature to Improve Purge Efficiency in PHEV's," IPCOM No. 000234775, Published Feb. 4, 2014, 2 pages.

Anonymous, "Method to Control Fuel Vapor Flow Into Canister During Refueling for HEV's," IPCOM No. 000234787, Published Feb. 5, 2014, 2 pages.

* cited by examiner

FUEL TANK DEPRESSURIZATION BEFORE REFUELING A PLUG-IN HYBRID VEHICLE

FIELD

The field of the present disclosure relates to motor vehicle fuel systems.

BACKGROUND/SUMMARY

To reduce discharge of fuel vapors into the atmosphere, motor vehicles induct fuel vapors from a fuel tank into the engine. A carbon canister is also coupled to the fuel tank to adsorb fuel vapors under some conditions when the internal combustion engine is not running. The carbon canister, however, has limited capacity.

In the case of plug in hybrid vehicles, the internal combustion engine may not operate for a prolonged period of time. In such systems, the fuel tank may be sealed and at a relatively high pressure. An automatic lock of the fuel cap is provided. Before refueling, the operator presses a dashboard button and, in response, the fuel tank is vented through the carbon canister to reduce fuel tank pressure. When a fuel tank pressure sensor indicates that the fuel tank pressure has fallen to a predetermined level, the fuel cap unlocked.

The inventors herein have recognized an issue with the above type of systems. In the event of a degraded fuel tank pressure sensor, unlocking of the fuel cap may be delayed or impaired. The inventors herein have addressed this issue by venting a fuel tank into a vapor absorbent canister in response to a request to refuel; and unlocking the fuel cap in response to a predetermined temperature change in the canister. As vapors are absorbed in the canister, the temperature rises, and as fuel tank pressure decreases fewer vapors are absorbed, and the canister temperature then declines. These changes in temperature may be used to detect when the fuel tank has depressurized. Such detection may occur in the absence of a fuel tank pressure sensor, or when a fuel tank pressure sensor has degraded. In another aspect of the solution, the detection may also occur in response to both a pressure sensor and detection of a predetermined temperature change.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
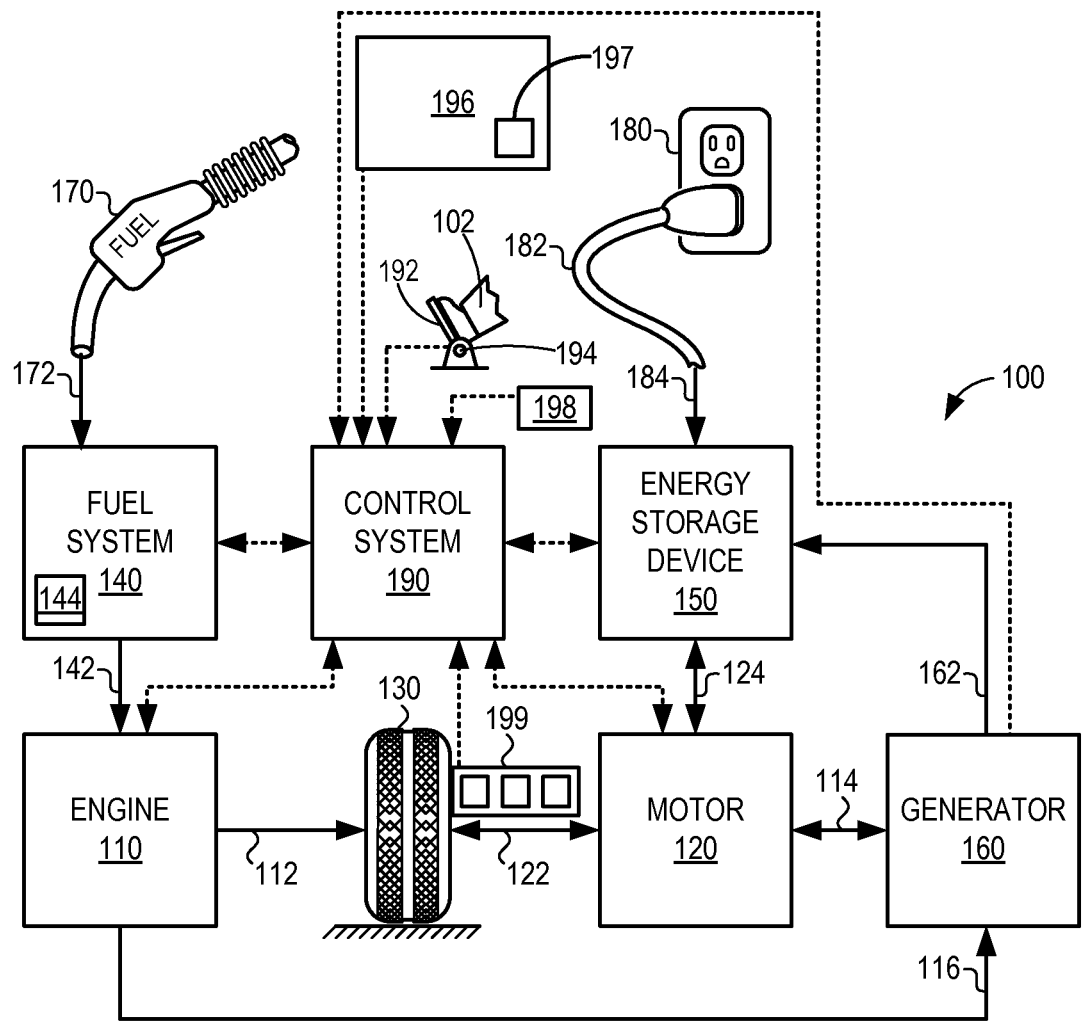
FIG. 1 shows an example vehicle propulsion system.
Figure 2:
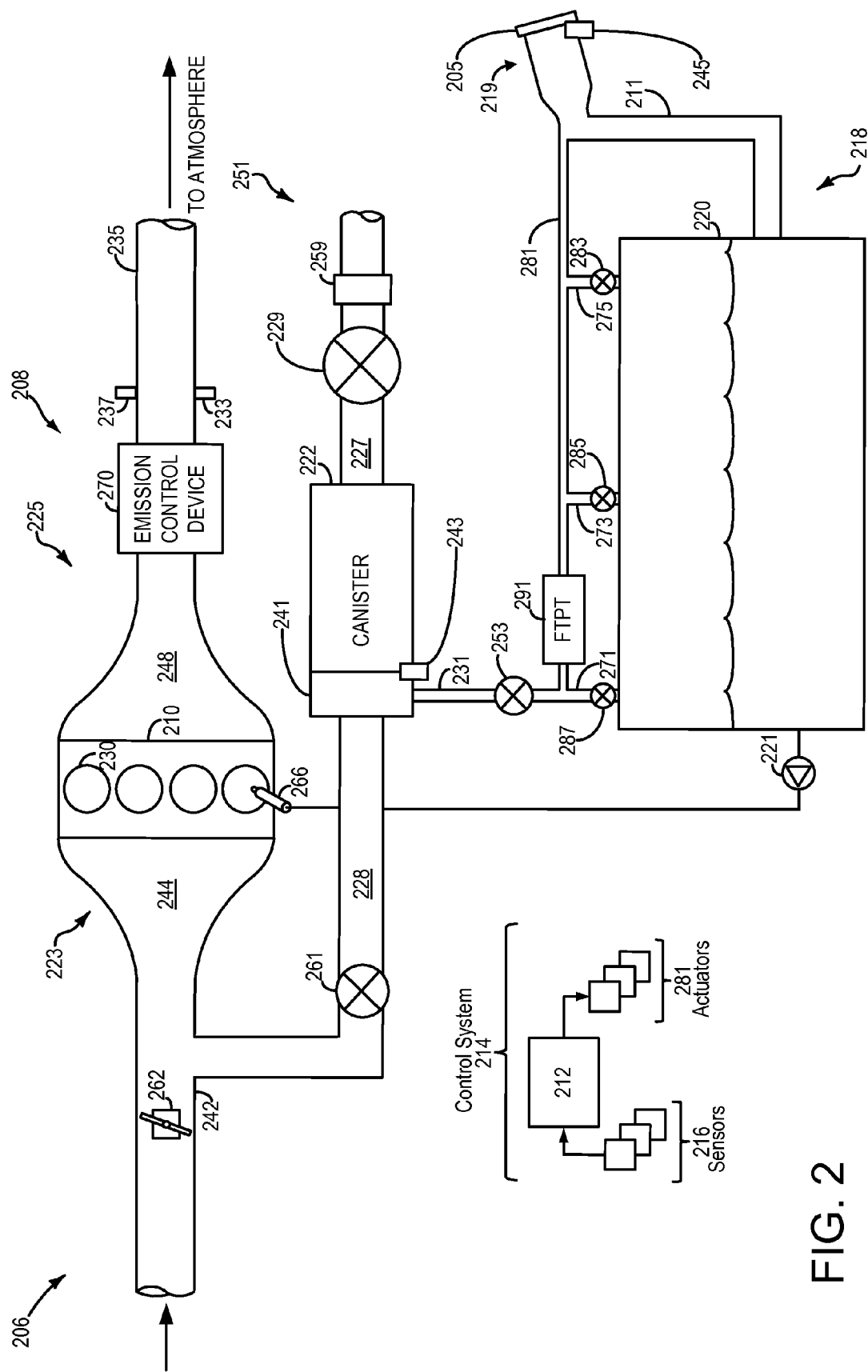
FIG. 2 shows an example vehicle system with a fuel system.

The following description relates to systems and methods for controlling a locking mechanism on a fuel cap for refueling a vehicle, e.g., the hybrid vehicle shown in FIG. 1. The vehicle includes an engine system with a fuel system, as shown in FIG. 2, where the fuel system includes a fuel tank and a fuel cap with a locking mechanism configured to prevent the fuel cap from being opened. The fuel tank may be depressurized in order prevent fuel discharging from a fuel filler pipe during refueling. As such, the fuel cap may remain locked until the fuel tank is sufficiently depressurized. As described below with reference to FIGS. 3 and 4, following a refueling request the fuel tank may be vented to a fuel vapor canister and the temperature in the fuel vapor canister may be monitored to assist in determining when the fuel tank is sufficiently depressurized so that refueling may be performed. For example, a predetermined temperature change in the fuel vapor canister may be used to detect when the fuel tank has depressurized. In some examples, such detection may occur in the absence of a fuel tank pressure sensor, or when a fuel tank pressure sensor has degraded. In another aspect of the solution, the detection may also occur in response to both a pressure sensor and detection of a predetermined temperature change in the canister.

Turning now to the figures, FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g. gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e. set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g. E10, E85, etc.) or a blend of gasoline and methanol (e.g. M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. As will be described by the process flow of FIG. 3, control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g. not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g. as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, as described in more detail below, in response to the vehicle operator actuating refueling button 197, a fuel tank in the vehicle may be depressurized so that refueling may be performed.

In an alternative embodiment, the vehicle instrument panel 196 may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

FIG. 2 shows a schematic depiction of a vehicle system 206. The vehicle system 206 includes an engine system 208 coupled to an emissions control system 251 and a fuel system 218. Emission control system 251 includes a fuel vapor container or canister 222 which may be used to capture and store fuel vapors. In some examples, vehicle system 206 may be a hybrid electric vehicle system.

The engine system 208 may include an engine 210 having a plurality of cylinders 230. The engine 210 includes an engine intake 223 and an engine exhaust 225. The engine intake 223 includes a throttle 262 fluidly coupled to the engine intake manifold 244 via an intake passage 242. The engine exhaust 225 includes an exhaust manifold 248 leading to an exhaust passage 235 that routes exhaust gas to the atmosphere. The engine exhaust 225 may include one or more emission control devices 270, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

Fuel system 218 may include a fuel tank 220 coupled to a fuel pump system 221. The fuel pump system 221 may include one or more pumps for pressurizing fuel delivered to the injectors of engine 210, such as the example injector 266 shown. While only a single injector 266 is shown, additional injectors are provided for each cylinder. It will be appreciated that fuel system 218 may be a return-less fuel system, a return fuel system, or various other types of fuel system.

Vapors generated in fuel system 218 may be routed to an evaporative emissions control system 251 which includes a fuel vapor canister 222 via vapor recovery line 231, before being purged to the engine intake 223. Fuel vapor canister 222 may include a buffer or load port 241 to which fuel vapor recovery line 231 is coupled. Further, a temperature sensor 243 may be included in fuel vapor canister 222 so that temperature changes in the fuel vapor canister may be monitored to assist in determining when the fuel tank is depressurized prior to refueling. The temperature sensor 243 may be located in load port 241 of fuel vapor canister 222 or in any other suitable location in canister 222. Fuel vapors undergo an exothermic reaction when carbon in the canister adsorbs vapor from the fuel tank thus the temperature of the fuel vapor canister, e.g., as determined by temperature sensor 243, may increase when the fuel tank is vented to the canister. Thus, as described below, temperature changes in the canister while the fuel tank is vented thereto may be used to determine an amount of pressure in the fuel tank. Further, temperature in the fuel vapor canister may decrease when pressure in the fuel tank is below atmospheric pressure, e.g., during vacuum conditions, since in this example, the vacuum in the fuel tank draws fuel vapor from the fuel vapor canister into the tank. This decrease in temperature in the canister while the fuel tank is vented to the canister may be used to determine when an amount of vacuum in the fuel tank falls below a threshold vacuum.

Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275. Further, in some examples, one or more fuel tank isolation valves may be included in recovery line 231 or in conduits 271, 273, or 275. Among other functions, fuel tank isolation valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283, and/or conduit 231 may include an isolation valve 253. Further, in some examples, recovery line 231 may be coupled to a fuel filler system 219. In some examples, fuel filler system may include a fuel cap 205 for sealing off the fuel filler system from the atmosphere. Refueling system 219 is coupled to fuel tank 220 via a fuel filler pipe or neck 211. Further, a fuel cap locking mechanism 245 may be coupled to fuel cap 205. The fuel cap locking mechanism may be configured to automatically lock the fuel cap in a closed position so that the fuel cap cannot be opened. For example, as described in more detail below, the fuel cap 205 may remain locked via locking mechanism 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold.

A fuel tank pressure transducer (FTPT) 291, or fuel tank pressure sensor, may be included between the fuel tank 220 and fuel vapor canister 222, to provide an estimate of a fuel tank pressure. As described below, in some examples, during engine off conditions sensor 291 may be used to monitor changes in pressure and/or vacuum in the fuel system to determine if a leak is present. The fuel tank pressure transducer may alternately be located in vapor recovery line 231, purge line 228, vent line 227, or other location within emission control system 251 without affecting its engine-off leak detection ability. As another example, one or more fuel tank pressure sensors may be located within fuel tank 220.

Emissions control system 251 may include one or more emissions control devices, such as one or more fuel vapor canisters 222 filled with an appropriate adsorbent, the canisters are configured to temporarily trap fuel vapors (including vaporized hydrocarbons) during fuel tank refilling operations and "running loss" (that is, fuel vaporized during vehicle operation). In one example, the adsorbent used is activated charcoal. Emissions control system 251 may further include a canister ventilation path or vent line 227 which may route gases out of the canister 222 to the atmosphere when storing, or trapping, fuel vapors from fuel system 218.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake 244 is provided to the fuel vapor canister for purging. In some examples, vent line 227 may include an air filter 259 disposed therein upstream of a canister 222.

Flow of air and vapors between canister 222 and the atmosphere may be regulated by a canister vent valve 229. Canister vent valve may be a normally open valve so that fuel tank isolation valve 253 may be used to control venting of fuel tank 220 with the atmosphere. For example, in hybrid vehicle applications, isolation valve 253 may be a normally closed valve so that by opening isolation valve 253, fuel tank 220 may be vented to the atmosphere and by closing isolation valve 253, fuel tank 220 may be sealed from the atmosphere. In some examples, isolation valve 253 may be actuated by a solenoid so that, in response to a current supplied to the solenoid, the valve will open. For example, in hybrid vehicle applications, the fuel tank 220 may be sealed off from the atmosphere in order to contain diurnal vapors inside the tank since the engine run time is not guaranteed. Thus, for example, isolation valve 253 may be a normally closed valve which is opened in response to certain conditions. For example, isolation valve 253 may be commanded open following a refueling request in so that the fuel tank is depressurized prior to refueling, as described below.

The vehicle system 206 may further include a control system 214. Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device, temperature sensor 233, pressure sensor 291, and canister temperature sensor 243. Other sensors such as pressure, temperature, air/fuel ratio, and composition sensors may be coupled to various locations in the vehicle system 206. As another example, the actuators may include fuel injector 266, throttle 262, fuel tank isolation valve 253, pump 292, and fuel cap locking mechanism 245. The control system 214 may include a controller 212. The controller may receive input data from the various sensors, process the input data, and trigger the actuators in response to the processed input data based on instruction or code programmed therein corresponding to one or more routines. An example control routine is described herein with regard to FIG. 3.

Figure 3:
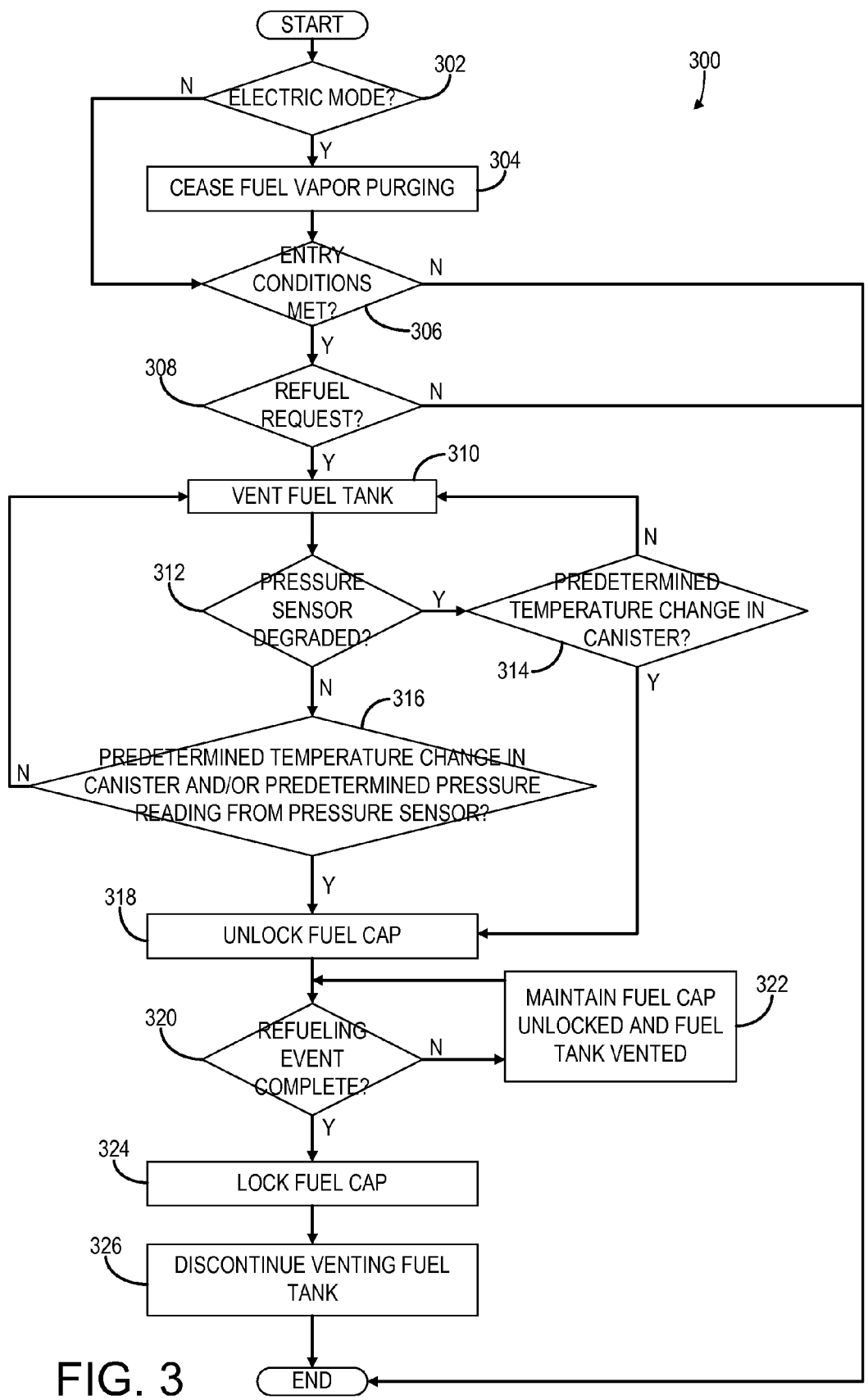
FIG. 3 shows an example method for unlocking a fuel cap in accordance with the disclosure.

FIG. 3 shows an example method 300 for controlling a locking mechanism on a fuel cap for refueling a fuel tank in a vehicle. In particular, a fuel cap may be maintained locked or in a closed position until a refueling request is generated and the fuel tank is sufficiently depressurized before refueling. In order to determine when the fuel cap may be unlocked or opened, pressure in the fuel tank may be monitored to determine when a pressure or vacuum in the fuel tank reaches a sufficiently low level so that the fuel cap may be opened for refueling.

At 302, method 300 may include determining if the vehicle is operating in an electric mode. For example, the vehicle may be a plug-in hybrid electric vehicle which may be operated in an electric mode with the engine-off. If the vehicle is not operating in electric mode at 302, method 300 proceeds to 306 described below. However, if the vehicle is operating in electric mode at 302, method 300 proceeds to 304. At 304, method 300 includes ceasing purging of fuel vapors from the fuel tank into an internal combustion engine when the vehicle is operating in an electric mode. For example, a fuel vapor purge valve 261 may be closed or maintained closed so that fuel vapors from the fuel tank are not delivered to the engine. Further, while operating in electric mode, the fuel tank may be sealed off from a fuel vapor canister and the atmosphere so that diurnal fuel vapors are contained in the fuel tank. In the case of plug in hybrid vehicles, the internal combustion engine may not operate for a prolonged period of time. In such systems, the fuel tank may be sealed and at a relatively high pressure.

At 306, method 300 includes determining if entry conditions are met. Entry conditions may include engine off conditions when an engine of the vehicle is not in operation. For example, the vehicle may be a hybrid electric vehicle operating in an engine off mode and being powered by batteries in the vehicle. As another example, entry conditions may include a key-off event wherein the vehicle is turned off, e.g., where the vehicle is parked or is not in use and the engine is not running Entry conditions may be further based on temperatures in the fuel system or evaporative emission control system, e.g., entry conditions during engine-off conditions may be based on a temperature in the fuel system less than a threshold temperature or greater than a threshold temperature. For example, entry conditions may include determining if a temperature in the fuel system is in a predetermined range of temperatures.

If entry conditions are met at 306, method 300 proceeds to 308. At 308, method 300 includes determining if a refuel request occurs. For example, a refuel request may comprise a vehicle operator depression of a button, e.g., refueling button 197, on a vehicle instrument panel in the vehicle, e.g., instrument panel 196. Thus, the refuel request may include manually requesting opening of a fuel cap coupled to the fuel tank. For example, a vehicle operator may provide input to the vehicle system indicating a desire to refuel the vehicle. If a refuel request occurs at 308, method 300 proceeds to 310.

At 310, method 300 includes venting the fuel tank. For example, the fuel tank may be vented into a vapor absorbent canister, e.g., canister 222, in response to a request to refuel so that the pressure or vacuum in the fuel tank is decreased to a predetermined level in preparation for refueling. For example, the fuel tank may be vented into the vapor absorbent canister through an isolation valve, e.g., isolation valve 253 may be opened.

At 312, method 300 may include determining if a pressure sensor is degraded. For example, a pressure sensor in the fuel system or in the fuel tank, e.g., sensor 291, may be used to monitor pressure in the fuel tank to determine when the fuel tank is sufficiently depressurized for refueling. However, if a fault in the pressure sensor is identified, then pressure changes in the fuel tank may not be able to be determined by the pressure sensor. Determining is the pressure sensor is degraded may be based on a variety of sensor diagnostic routines, e.g., performed prior to the refueling request. If the pressure sensor is degraded at 312, method 300 proceeds to 314.

At 314, method 300 includes determining if a predetermined temperature change in the fuel vapor canister occurs. The predetermined temperature change in the fuel vapor canister may indicate a stabilization in temperature of the vapor absorbent canister. For example, the predetermined temperature change in the canister may comprise an inflection in temperature of the canister. For example, an inflection in temperature of the canister may be determined based on a rate of change of temperature in the canister switching from increasing to decreasing. As another example, the predetermined temperature change may comprise a temperature increase in the canister greater than a threshold temperature increase when the fuel tank is pressurized, e.g., with a pressure greater than atmospheric pressure. As another example, if the fuel tank is under vacuum with a pressure less than atmospheric pressure, then the predetermined temperature change may comprise a temperature decrease in the canister greater than a threshold temperature decrease. These temperature changes in fuel vapor canister may be monitored via a temperature sensor in the canister, e.g., temperature sensor 243.

If a predetermined temperature change in the fuel vapor canister does not occur at 314, method 300 returns to 310 to continue venting the fuel tank until the fuel tank is sufficiently depressurized. However, if a predetermined temperature change in the fuel vapor canister occurs at 314, method 300 proceeds to 318 to unlock or open the fuel cap. For example, if a fault is identified in a pressure sensor in the fuel system, unlocking the fuel cap may be responsive to the fault so that unlocking occurs based only on a temperature change in the canister when the pressure sensor has failed. The predetermined temperature change in the canister may indicate that pressure in the fuel tank is at a desired level so that the fuel cap may be unlocked or opened so that refueling may be performed.

Returning to 312, if the pressure sensor is not degraded at 312, then method proceeds to 316. At 316, method 300 includes determining if a predetermined temperature change in the fuel vapor canister occurs and/or if a predetermined pressure reading from the pressure sensor occurs. In some examples, determining pressure in the fuel tank may be based on readings from a pressure sensor in the fuel system or in the fuel tank, e.g., pressure sensor 291, and readings from a temperature sensor in the fuel vapor canister, e.g., temperature sensor 243. For example, sufficient depressurization of the fuel tank may be indicated based on both a pressure reading in the fuel system and based on a predetermined temperature change in the canister as described above.

If the conditions of step 316 are not met, then method 300 returns to 310 to continue venting the fuel tank. However, if the conditions of step 316 are met, then method 300 proceeds to 318 to unlock or open the fuel cap. For example, unlocking the fuel cap may be performed when both a pressure sensor and a temperature change in the fuel vapor canister indicate pressure in the fuel tank is at a desired level.

At 320, method 300 includes determining if the refueling event is complete. If the refueling event is not complete at 320, then method 300 proceeds to 322 to maintain the fuel cap unlocked and the fuel tank vented until the refueling event is complete. Once the refueling event is complete at 320, method 300 proceeds to 324. At 324, method 300 includes locking or closing the fuel cap, and at 326, method 300 includes discontinuing venting the fuel tank. For example, after refueling is complete the fuel cap may be closed and locked and the fuel tank isolation valve 253 may be closed to seal the fuel tank from the canister and atmosphere.

Figure 4:
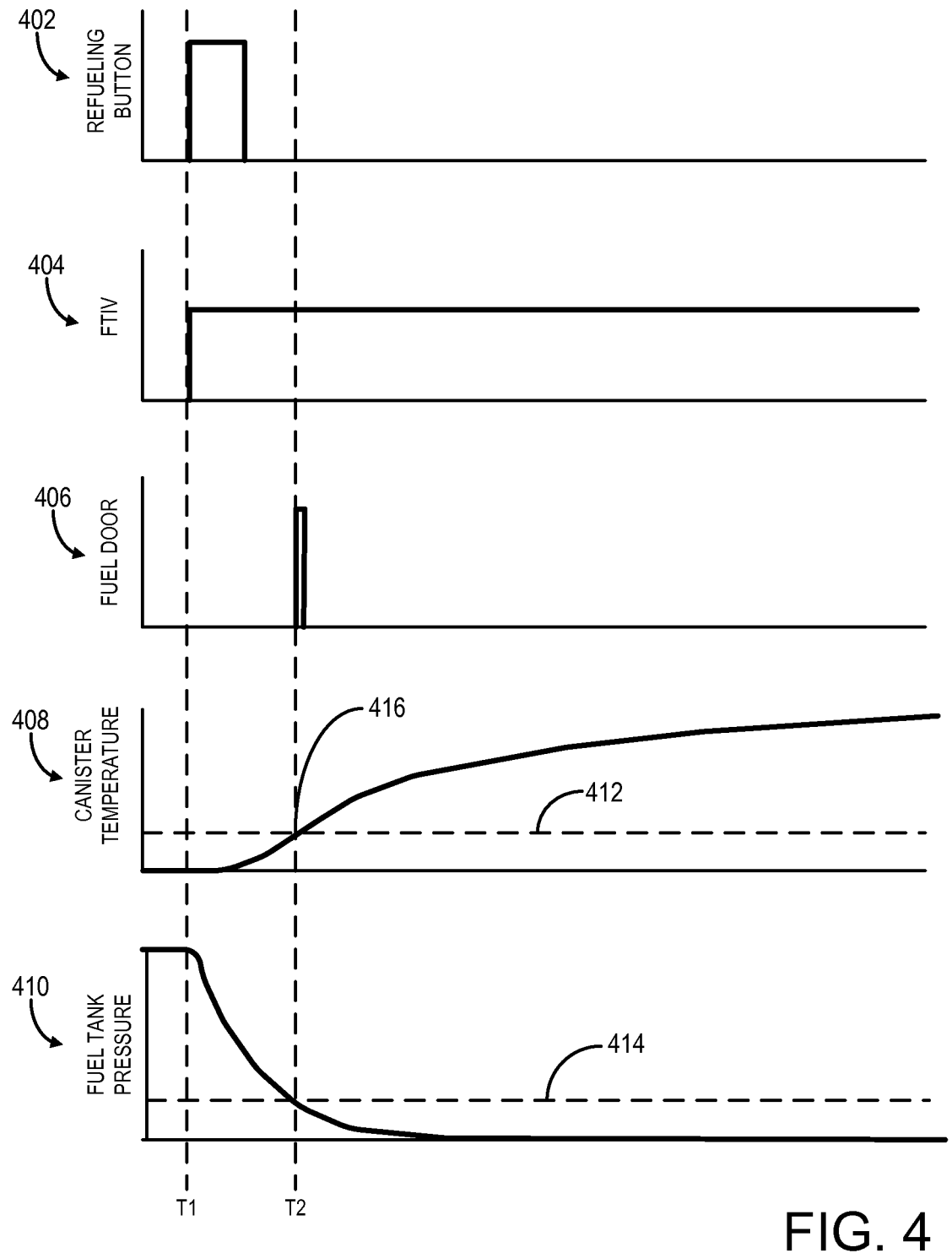
FIG. 4 illustrates an example method for unlocking a fuel cap in accordance with the disclosure.

FIG. 4 illustrates an example method, e.g., method 300 described above, for unlocking a fuel cap after the fuel tank is sufficiently depressurized. The graph 402 in FIG. 4 shows actuation of a refueling button, e.g., refueling button 197, versus time. The graph at 404 shows actuation of a fuel tank isolation valve (FTIV), e.g., valve 353, versus time. The graph 404 shows actuation of a fuel cap or fuel door or fuel cap locking mechanism, e.g., locking mechanism 245, versus time. The graph 408 shows canister temperature, e.g., as measured by temperature sensor 243, as a function of time. The graph 410 shows fuel tank pressure, e.g., as measured by pressure sensor 291, versus time.

At time T1 in FIG. 4 a refueling request is generated as indicated by actuation of the refueling button. In response to the refueling request, the isolation valve is actuated to an open position to vent the fuel tank to the fuel vapor canister and the atmosphere so that pressure in the fuel tank is decreased in preparation for refueling. As shown in graph 410, after the fuel tank is vented to the canister, pressure in the fuel tank begins to decrease as fuel vapor is vented from the fuel tank into the canister. As fuel vapor from the fuel tank is adsorbed in the canister, the temperature in the canister begins to increase, as shown in graph 410. At time T2, a predetermined temperature change 416 occurs in the canister indicating that the fuel tank is sufficiently depressurized. For example, the predetermined temperature change may be an inflection point in the temperature change of the canister or may be an amount of temperature change in the canister greater than a temperature threshold 412, e.g., a temperature increase to the threshold 412. Further, as shown in graph 414, the pressure in the fuel tank decreases to a pressure threshold 414 indicating that the fuel tank is sufficiently depressurized for refueling. Thus, at time T2, the fuel door or cap may be actuated or unlocked, as indicated in graph 406, so that refueling may be performed.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for controlling opening of a fuel cap while a fuel tank of a plug-in hybrid vehicle is pressurized, comprising:
    receiving, at a controller, a manually requested opening of the fuel cap coupled to the fuel tank;
    in response to said received request, adjusting a valve via the controller to vent the fuel tank into a vapor absorbent container;
    responsive to no failure of a pressure sensor, unlocking the fuel cap, via the controller, when the pressure sensor indicates pressure in the fuel tank is at a desired level; and
    responsive to failure of said pressure sensor, unlocking the fuel cap via the controller only based on a temperature change in said vapor absorbent container after adjusting the valve.

2. The method of claim 1, wherein the temperature change comprises an inflection in temperature of the container.

3. The method of claim 1, wherein the temperature change includes an inflection in canister temperature change monitored by the controller including determining where a rate of change of a canister temperature switches from increasing to decreasing.

4. The method of claim 1, wherein the temperature change comprises an inflection in temperature of the container based on a rate of change of temperature.

5. A method for controlling opening of a fuel cap while a fuel tank of a plug-in hybrid vehicle is pressurized, comprising:
    ceasing purging of fuel vapors from the fuel tank into an internal combustion engine via a controller when the vehicle is operating in an electric mode;
    receiving a manually requested refuel at the controller;
    in response to said request, venting the fuel tank into a vapor absorbent container via the controller opening a fuel tank isolation valve; and unlocking the fuel cap via the controller when a temperature change in said vapor absorbent container indicates pressure in the fuel tank is at a desired level.

6. The method of claim 5, wherein said temperature change comprises an inflection in temperature of said vapor absorbing container, the inflection including canister temperature monitored by the controller having a rate of change of the canister temperature switching from increasing to decreasing.

7. The method of claim 5, wherein said step of unlocking the fuel cap is further responsive to a pressure sensor coupled to the fuel tank, and wherein the unlocking of the fuel cap occurs while the isolation valve is open, after receiving the manually requested refuel, and responsive to an inflection of canister temperature monitored by the controller having a rate of change of the canister temperature switching from increasing to decreasing.

8. The method of claim 7, wherein said step of unlocking the fuel cap is responsive to a fault in said pressure sensor.

9. The method of claim 7, wherein said step of unlocking the fuel cap is responsive to both a fuel tank pressure indication from said pressure sensor and said temperature change in said vapor absorbent container.

10. The method of claim 5, further comprising, via the controller, locking the fuel cap and discontinuing venting the fuel tank after a refueling is completed.

\* \* \* \* \*